United States Patent [19]

Nakamura

[11] Patent Number: 5,297,860
[45] Date of Patent: Mar. 29, 1994

[54] BRAKE CONTROL DEVICE
[75] Inventor: Hirotaka Nakamura, Tokyo, Japan
[73] Assignee: Akebono Brake Industry Co., Ltd., Tokyo, Japan
[21] Appl. No.: 914,474
[22] Filed: Jul. 15, 1992
[30] Foreign Application Priority Data
  Jul. 19, 1991 [JP] Japan .................. 3-179888
[51] Int. Cl.$^5$ ............................. B60T 8/40
[52] U.S. Cl. ............... 303/113.2; 303/117.1; 303/118.1; 303/119.2; 137/102; 137/112
[58] Field of Search ............ 303/113.1, 113.2, 113.5, 303/115.1, 115.3, 115.4, 117.1, 119.2, 900, DIG. 1, DIG. 2, 68, 69, 118.1, 2, 13, 14, 36, 37; 137/102, 112

[56] References Cited

U.S. PATENT DOCUMENTS

| | | | |
|---|---|---|---|
| 3,503,655 | 3/1970 | Heimler | 303/13 X |
| 3,606,904 | 9/1971 | Taylor | 137/102 |
| 3,920,282 | 11/1975 | DeVlieg | 303/113.5 |
| 3,927,914 | 12/1975 | Fink et al. | 303/115.1 |
| 4,708,403 | 11/1987 | Russell | 137/102 X |
| 4,794,267 | 12/1988 | Stevens | 303/115.1 |
| 4,889,395 | 12/1989 | Fujita et al. | 303/115.1 |
| 4,973,108 | 11/1990 | Maki et al. | 303/DIG. 3 |
| 5,020,564 | 6/1991 | Thoman et al. | 137/102 |
| 5,112,114 | 5/1992 | Cogswell,II et al. | 303/113.2 |
| 5,114,216 | 5/1992 | Tsuda et al. | 303/117.1 |

FOREIGN PATENT DOCUMENTS

1-54226 11/1989 Japan .
2251278 7/1992 United Kingdom .

Primary Examiner—Andres Kashnikow
Assistant Examiner—Peter M. Poon
Attorney, Agent, or Firm—Knobbe, Martens, Olson & Bear

[57] ABSTRACT

A brake control device to be used for brake control and traction control of a motor vehicle includes a shuttle valve, a modulator, a traction control valve and a throttle valve. The shuttle valve selects a higher air pressure either from a brake valve, which operates when the brake is applied, or from a traction control valve, which opens during traction control to prevent wheel slippage. The shuttle valve allows the higher of the two air pressures to enter the modulator, which converts the entering air pressure to a brake hydraulic pressure to be supplied to the wheel cylinders of the motor vehicle. The throttle valve provided between the traction control valve and the shuttle valve decreases the air pressure from the traction control valve to be transmitted to the modulator when the traction control is activated. The throttle valve and the shuttle valve cooperate to increase the number of discharge air passages so that the brake control device has a greater discharge capacity when the brakes are released.

11 Claims, 7 Drawing Sheets

BRAKE CONTROL DEVICE

BACKGROUND OF THE INVENTION

The present invention relates to a brake control device in an air over hydraulic brake system mounted on a motor vehicle.

As a conventional technique, a brake control mechanism for controlling the brake fluid pressure of wheel cylinders has been known, in which an air over hydraulic cylinder including a built-in air piston on one side and a built-in hydraulic piston on the other side, and a pneumatic pressure fed from the air piston is changed to a fluid pressure, for controlling the fluid pressure in the wheel cylinders.

The provision of the modulator stated above with solenoid valves (hold and decay valves) mounted as one unit (a valve unit) is considered for the suction of air into, holding of the air within, and discharge of the air from, an air chamber of the modulator. There has been proposed in U.S. Ser. No. 07/694,341 a single valve unit, as an example, including the hold valve and the decay valve.

Figure 8:
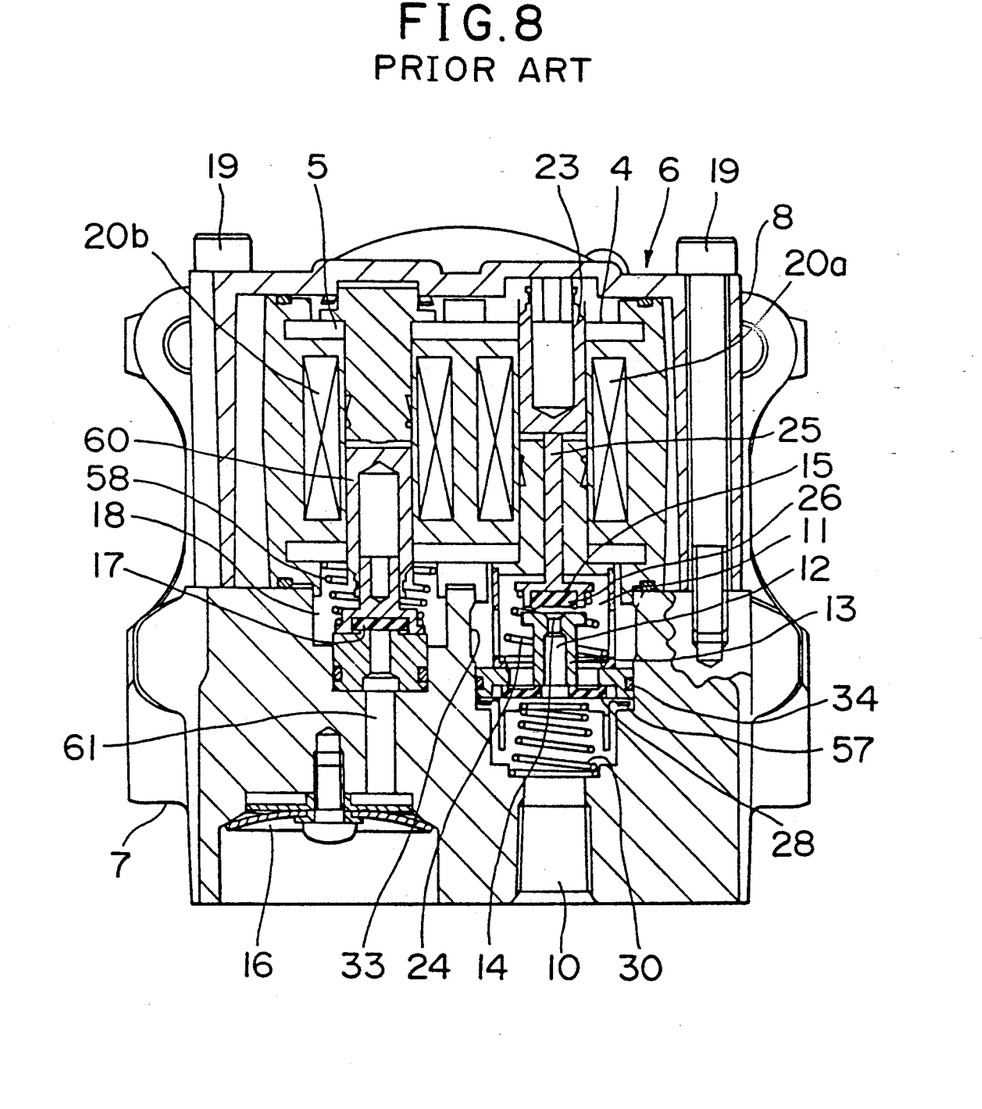
FIG. 8 is a sectional side elevation showing the construction of a valve unit in a conventional embodiment.

FIG. 8 shows the constitution of the valve unit mounted in such a modulator. Hereinafter there will be explained the major constitution of a valve unit 6. In the valve unit 6 a hold valve 4 as a first valve device and a decay valve 5 as a second valve device are arranged in parallel. A valve block 7 which comprises the hold valve 4 and the decay valve 5 and a solenoid block 8 which generates an electromagnetic force is securely fastened in one body by means of through bolts 19.

The hold valve 4 has a hold plunger 23 which is movable in an axial direction in the hollow section of a solenoid coil 20a. The bottom end of this hold plunger 23 is in contact with the top end of a valve pin 25 being pressed upwardly by a hold spring 24 inserted in the valve block 7. The bottom end of this valve pin 25 is expanded in a hold valve chamber 11 (a first valve chamber). At the bottom end face of the valve pin 25 is installed a valve rubber 26, forming a hold valve body 15. In the hold valve chamber 11 which is the first valve chamber, a valve receiving body 13 is provided under the valve pin 25. Provided in the interior of this valve receiving body 13 is an air suction passage 12 drilled in an axial direction for communication with an air inlet 10. Furthermore, there is formed an opening 14 in the top end face of the aforesaid air suction passage 12, opposite to the hold valve body 15. In the periphery of the valve receiving body 13 is fitted an O-ring 34 for preventing air leakage from the inlet 10 side to the hold valve chamber 11 side when the valve is closed.

At the bottom end of the valve receiving body 13 is installed a return valve 28 which permits only the flow of the air from the hold valve chamber 11 to the air inlet 10 side, being pressed upwardly by a return spring 30.

In the hold valve chamber 11 the chamber passage communicating with the air chamber of the modulator is open.

In this description the decay valve will not be explained.

It is conceivable that an accelerator slip control mechanism can be used correspondingly to such a modulator.

As a prior-art example, there has been disclosed a brake control device equipped with an acceleration slip control mechanism in Japanese Patent Publication No. Hei 1-54226. The brake control device disclosed in this patent is provided with a changeover valve which is located between the brake valve and brake pressure supply solenoid valve and the wheel brake solenoid valve.

This control device functions to selectively supply the higher of the pressures from either the brake valve or from the brake pressure supply solenoid valve, to the wheel brake solenoid valve. The control device controls the fluid pressure to be supplied to the brake wheel cylinders, in accordance with a command from a comparison electric circuit device, thereby performing antilock control and traction control.

According to the aforementioned prior-art brake control device, the air in the air chamber is discharged out at the brake valve through the air inlet 10 from the hold valve 4 side at the time of common release of the brakes. Therefore, there exists a great resistance in the line from the air inlet 10 to a brake valve, reducing an air discharge capacity and accordingly resulting in lowered responsivity at the time of release of the brakes.

In the brake control device which serves also as a traction control mechanism, the air from an air reservoir is supplied directly from the brake pressure supply solenoid valve to the wheel brake solenoid valve via the changeover valve; there is, therefore, a problem that the built-up rate of pressure application increases as compared with the ordinary braking effected by a brake pedal pressure applied by a driver, resulting in deteriorated brake controllability and vehicle body vibration. If one tries to adjust an increase or reduction of pressure by means of the comparison electric circuit and the wheel brake solenoid valve, the control method will become difficult to perform and component parts of the brake control device will become complicated and expensive.

SUMMARY OF THE INVENTION

In view of the above-described various disadvantages inherent in the heretofore known technique, it is an object of the present invention to provide a brake control device which has a greater capacity to discharge a large amount of air when the brakes are released and higher responsivity to the release of the brakes, and enables stabilized traction control.

The brake control device of the present invention comprises a brake valve 38 inserted in a first circuit 86 which is connected between a pressure source 37 and wheel cylinders 3, a modulator 21 which is located between the brake valve 38 and the wheel cylinder 3 controls a pressure supplied to the wheel cylinder 3, a control valve 41 which is mounted in a second circuit 88 connected between a pressure source 39 and the modulator 21 opens at the time of traction control, a shuttle valve 71 which selects a higher one of a pressure from the brake valve 38 and a pressure from the control valve 41, supplies the pressure to the modulator 21, and a throttle valve 81 installed for restricting only the flow of air from the control valve 41 toward the shuttle valve 71 between the control valve 41 and the shuttle valve 71.

The air that flowed into a connecting passage 65 via the control valve 41 presses a throttle valve piston 82 against the shuttle valve device 71 side at the time of traction brake application, passes through a throttle passage 84. The air that has passed through the throttle passage 84 presses a shuttle valve piston 72 towards first air inlet 10 toward the air inlet 10 side, and passes through a communication passage 67, being supplied to an air chamber 1 through a first valve device 4.

In the case of ordinary release of brakes, the air from the air chamber 1 flows from the first valve device 4 into a connecting passage 65 through the communication passage 67, being discharged at the first air inlet 10. At this time, since a negative pressure is built up in a space on the shuttle valve device 71 side in connecting passage 65, in relation to a space on the throttle valve device 81 side, the shuttle valve piston 72 which is in contact with the throttle valve device 81 side in the connecting passage 65 moves toward the first air inlet 10 side to communicate the space on the shuttle valve device 71 side with the space on the throttle valve device 81 side, discharging the air which has come in from the air chamber 1, out also at the direction of the second air inlet 80.

Therefore it is possible to decrease the built-up rate of pressure application at the time of brake pressure application in the traction control to allow the adjustment of brake control. Also, it is possible to drive the air out of the two systems of the first air inlet 10 and the second air inlet 80. Other objects, features and advantages of the invention will become apparent from the following description of the embodiment of the present invention, together with the accompanying drawings.

DESCRIPTION OF THE PREFERRED EMBODIMENT

Hereinafter an exemplary embodiment of a brake control device according to the present invention will be described with reference to FIGS. 1 to 7.

Figure 6:
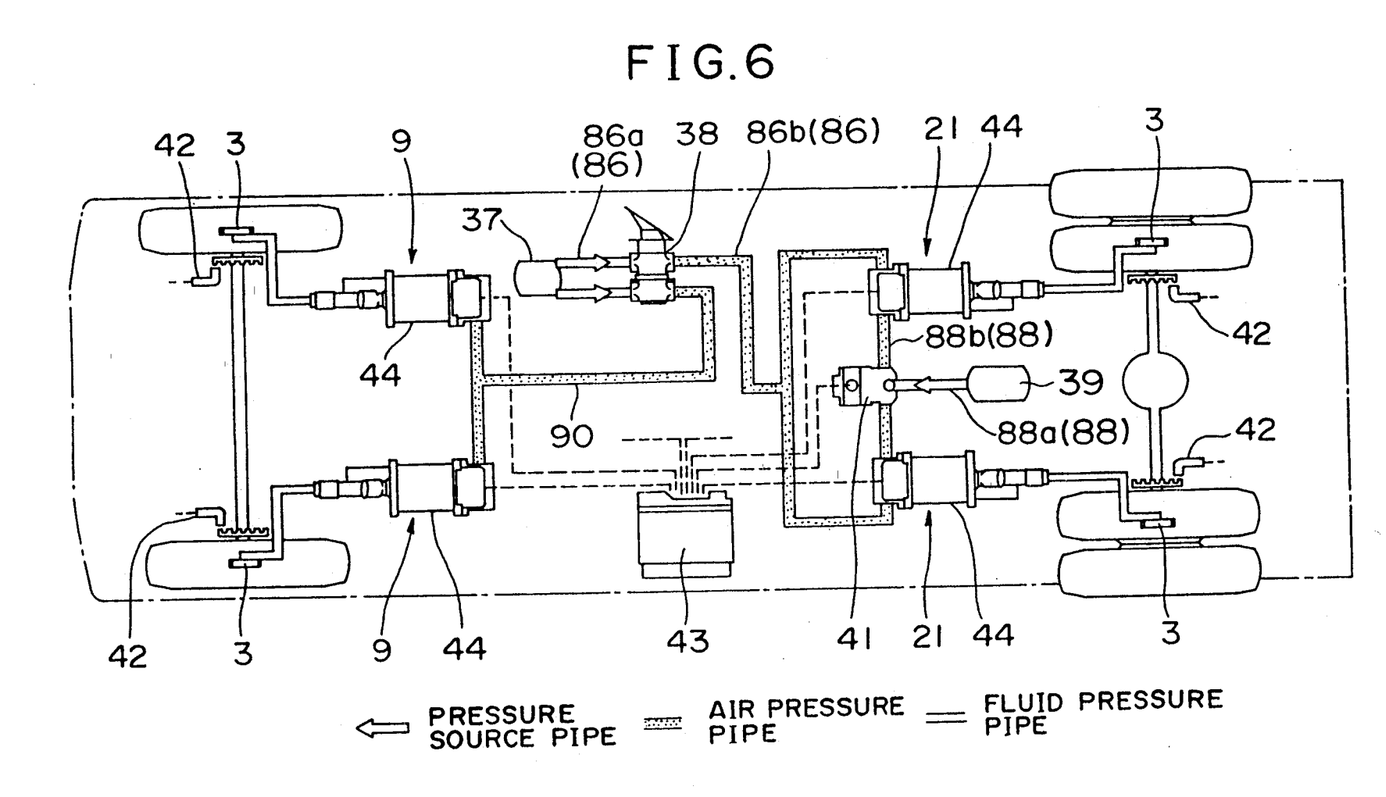
FIG. 6 is a block diagram showing a vehicle brake system in the embodiment.

First, a modulator of this embodiment will be explained. In a brake system on a motor vehicle, the modulators are arranged as shown in FIG. 6.

A first circuit 86a extending from an air reservoir 37 which is a first pressure source is connected to a brake valve 38. From this brake valve 38, the first circuit 86b is connected to modulators 21 on the rear wheels side which are the drive wheels. From the air reservoir 39 which is a second pressure source, a second circuit 88a extends to be connected to a traction control valve 41, from which a second circuit 88b extends and is connected to the modulators 21. The brake valve 38 is connected to modulators on the front wheels side by a third circuit 90.

A speed sensor 42 is provided for each of the front and rear wheels for detecting the speed of revolution of the wheel, and sends out a detection signal to an electronic control unit (ECU) 43.

The ECU 43 operates the traction control valve 41 and the modulators 9 and 21 according to the state of the detection signal inputted from the speed sensors 42 and a brake pedal, thereby controlling brake operation of each wheel.

Figure 4:
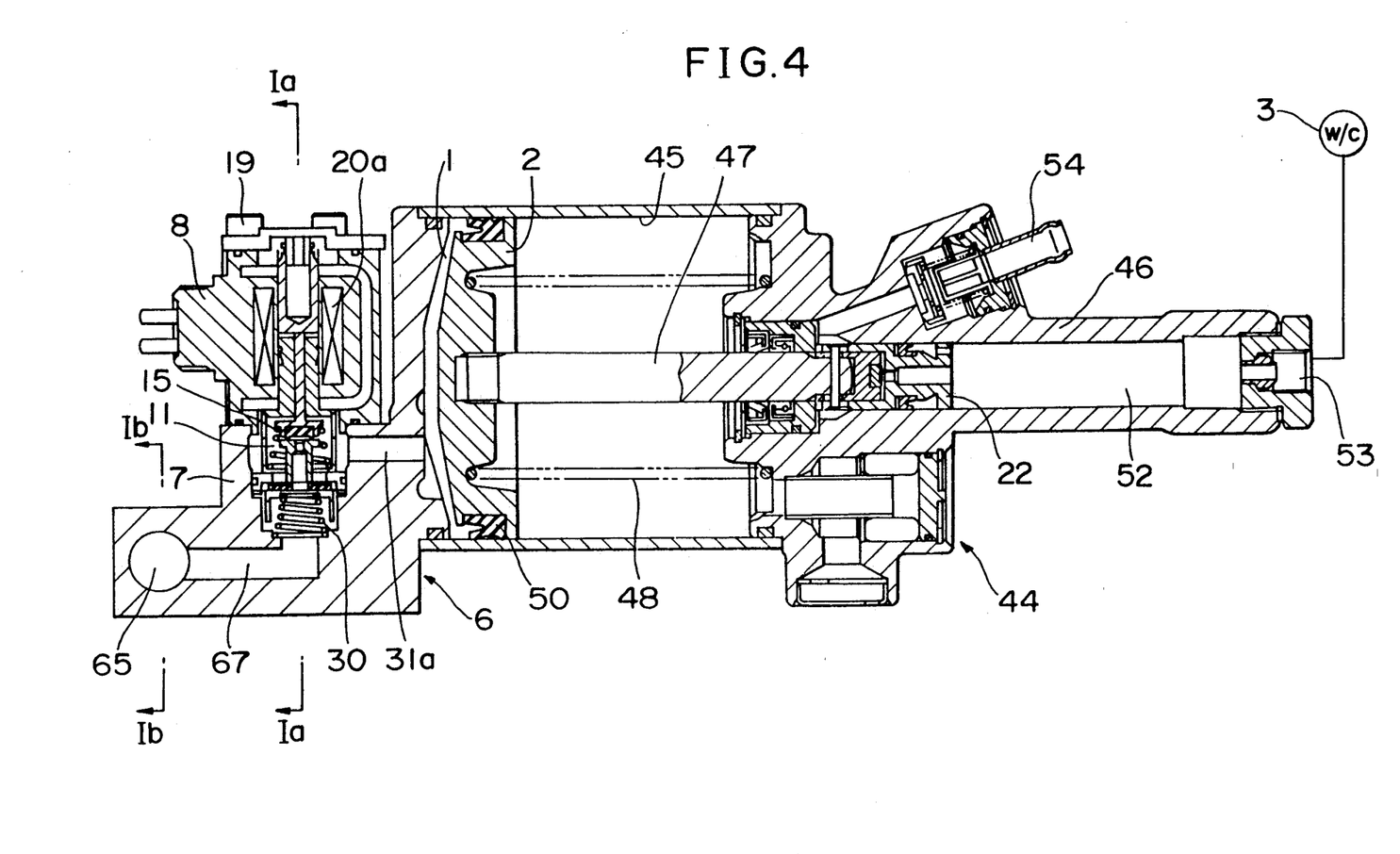
FIG. 4 is a longitudinal sectional view of a hold valve side showing the general constitution of the modulator in the embodiment.
Figure 5:
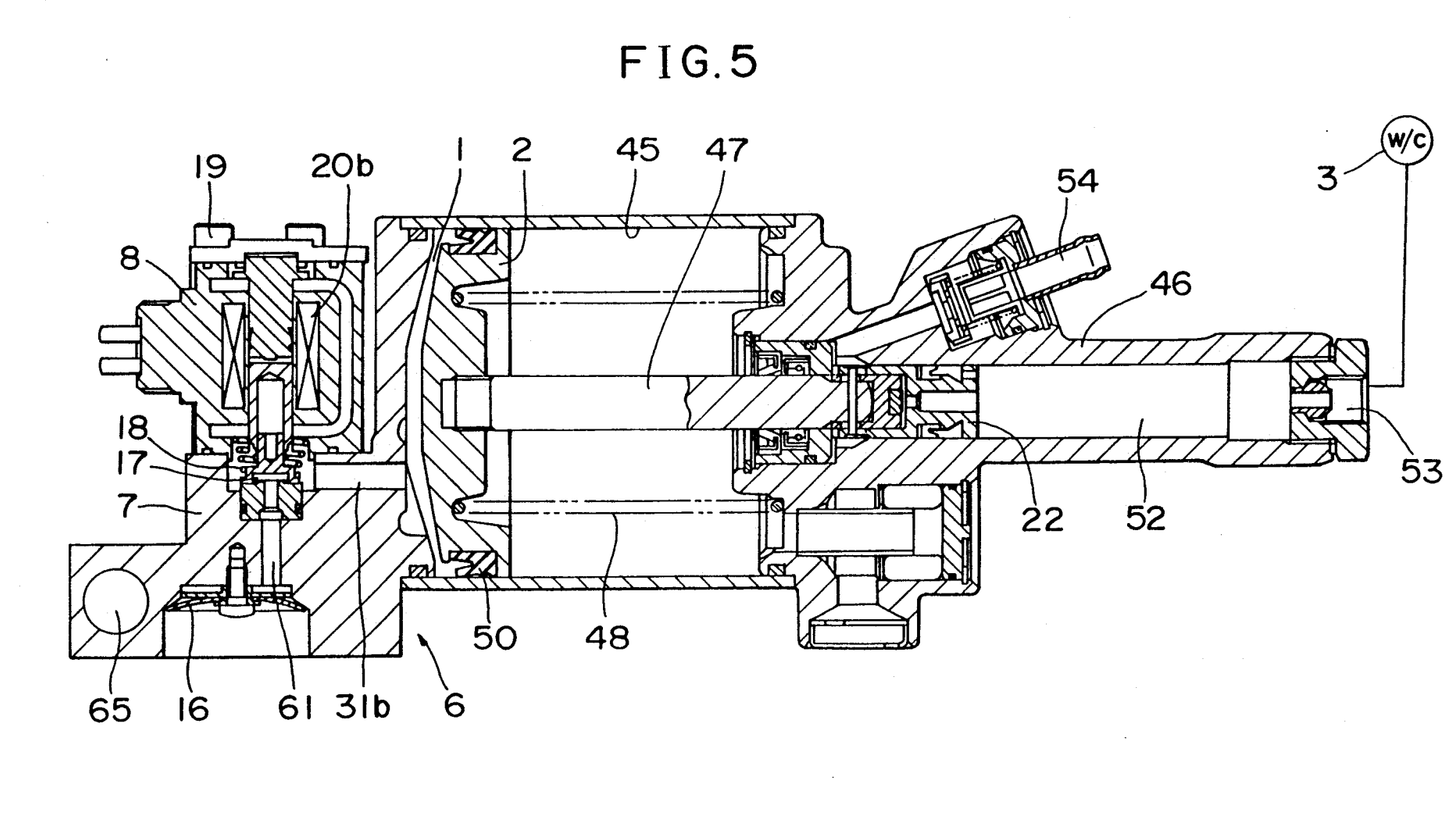
FIG. 5 is a longitudinal sectional view of a decay valve side showing the general constitution of the modulator in the embodiment.

Next, the modulators thus used will be explained by referring to FIGS. 4 and 5. FIG. 4 is a sectional view of the modulator 21 on the hold valve side, and FIG. 5 is a sectional view of the modulator 21 on the decay valve side.

The modulator 21 is composed of a modulator unit 44 and a valve unit 6, the modulator unit 44 comprising an air cylinder 45 and a hydraulic housing 46.

The air cylinder has inside an air piston 2 which is movable in the direction of the axis of the air cylinder 45, and a piston rod 47 which is movable in interlock with this air piston 2.

The air piston 2 is, in an ordinary state of operation, pressed toward the valve unit 6 side by a piston return spring 48 installed with its one end retained on the inner end face of the hydraulic housing 46, functioning to compress the air chamber 1 defined between the air piston 2 and the valve unit 6. On the outer surface of this air piston 2 is fitted an air cup 50, preventing air leaks from the air chamber 1 to the piston rod 47 side.

The hydraulic housing 46 is provided with a hydraulic cylinder 52 which is smaller in diameter than the air cylinder 45. In this hydraulic cylinder 52 is movably installed a hydraulic piston 22 which is connected to the end of the piston rod 47. On the forward end side of the hydraulic cylinder 52, a hydraulic outlet 53 communicating with the wheel cylinder (W/C) 3 is open.

The hydraulic housing 46 has, in its stepped section, a hydraulic inlet 54 communicating with an external reservoir, which is not illustrated, and opening into the hydraulic cylinder 52. Brake fluid is supplied from a brake fluid reservoir (not illustrated) into the hydraulic cylinder 52 through this hydraulic inlet 54.

In the hydraulic inlet 54 is installed a check valve, through which a fixed residual pressure is applied to the wheel cylinder 3.

Next, the construction of the valve unit 6 will be explained.

Figure 1A:
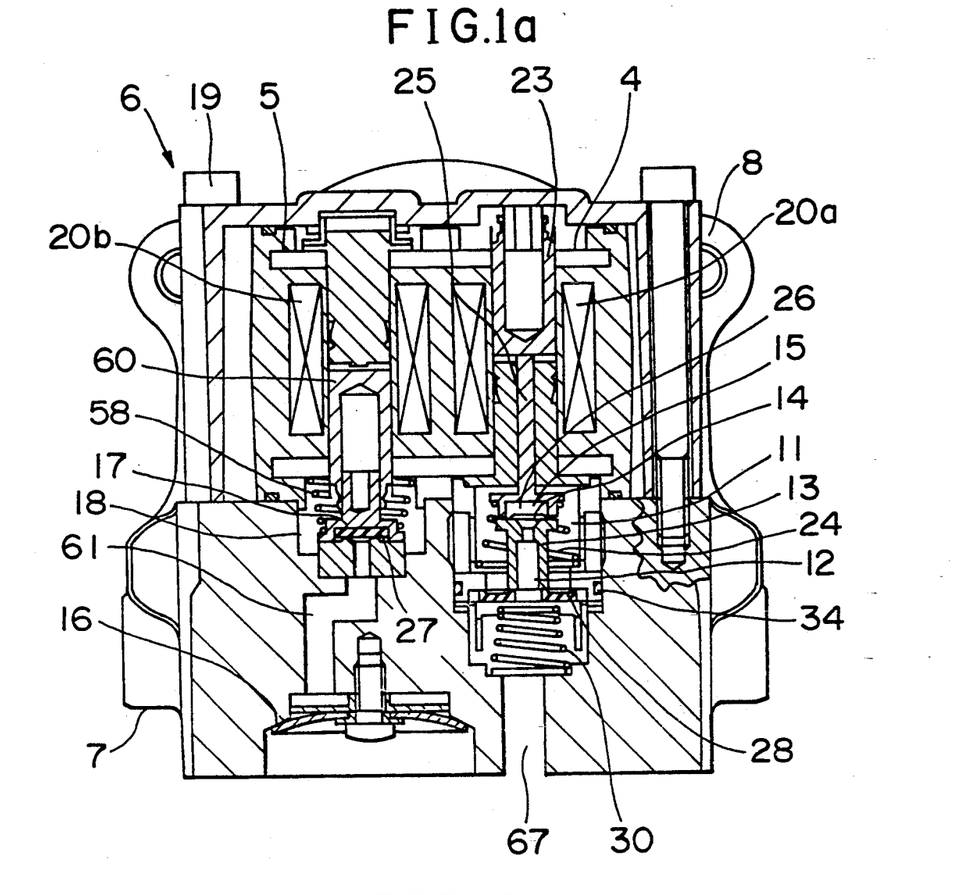
FIG. 1(a) is a sectional side elevation showing the internal construction of one embodiment of a brake control device according to the present invention during traction control pressure application of the valve unit taken along line Ia—Ia of FIG. 4.
Figure 1B:
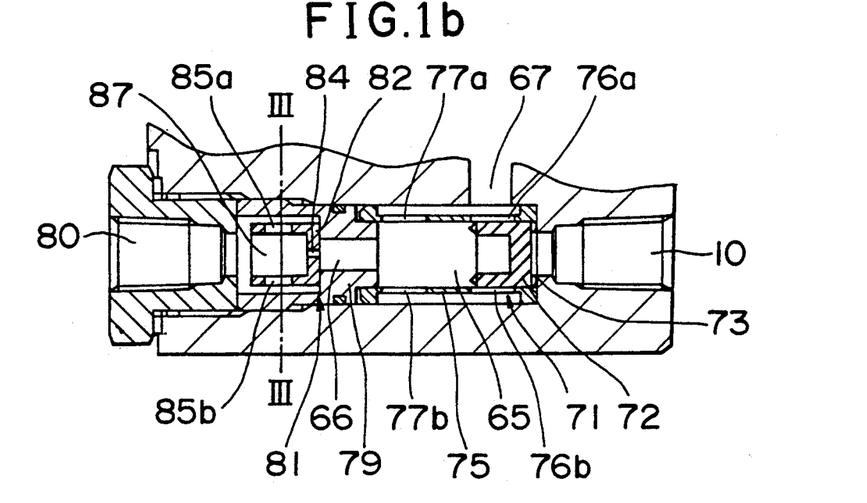
FIG. 1(b) is a sectional side elevation showing the valve unit in an embodiment during the traction control pressure application taken along line Ib—Ib of FIG. 4.

In the valve unit 6 of the present embodiment, the hold valve 4 is located on the right and the decay valve 5 on the left in FIGS. 1(a) and 1(b). This valve unit 6 is so designed and built that the solenoid block 8 and the valve block 7 are dividable. The solenoid block 8 is fixed by through bolts 19 to the valve block 7.

In the solenoid block 8, a solenoid coil 20a on the hold valve 4 side and a solenoid coil 20b on the decay valve 5 side, either wound on a bobbin, are resin-molded in one body.

Installed on the hold valve 4 side is a hold plunger 23, which is movable in the axial direction in the hollow section of the solenoid coil 20a. The bottom end of this hold plunger 23 is in contact with the top end of the valve pin 25 being pressed upwardly by a hold spring 24 inserted in the valve block 7. The bottom end of this valve pin 25 is expanded in the hold valve chamber 11. At the bottom end face of the valve pin 25 is installed a valve rubber 26, forming a hold valve body 15.

In the hold valve chamber 11, a valve receiving body 13 is a provided under the valve pin 25. Provided in the interior of this valve receiving body 13 is an air suction passage 12 drilled in an axial direction, with its one end communicating with a communication passage 67. Furthermore the other end (top end) of this air suction passage 12 forms an opening 14 in the top end face of the valve receiving body 13. In the periphery of the valve receiving body 13 is fitted an O-ring 34 for preventing air leakage from the communication passage 67 to the hold valve chamber 11 side when the valve is closed.

At the bottom end of the valve receiving body 13 is installed a return valve 28 which permits only the flow of the air from the hold valve chamber 11 toward the communication passage 67, being pressed upwardly by a return spring 30.

The hold valve body 15 of the hold valve 4 is pushed upwardly by a hold spring 24 when the solenoid coil 20a is not energized. That is, the control valve is so designed as to be constantly open with the hold valve body 15 held off the opening section 14. The hold valve chamber 11 communicates with the air chamber 1 through a chamber passage 31a as shown in FIG. 4.

The decay valve 5 has a decay plunger 60 which is pressed downwardly by a decay spring 58. The bottom end of the decay plunger 60 has an expanded section within the decay valve chamber 18. On the forward end of this expanded section is installed a valve rubber 27, forming a decay valve body 17.

The decay valve body 17 is in contact with an exhaust passage 61 communicating with an exhaust valve 16 when the solenoid coil 20b is not energized, forming a normally closed control valve. The decay valve chamber 18 communicates with the chamber passage 31b communicating with the air chamber 1 as shown in FIG. 5. However, in the normal state of operation, the decay valve body 17 is closed and therefore the air will not flow from the air chamber 1 toward the decay valve 5 side.

In the lower part of the valve block 7 is formed a connecting passage 65 which communicates in three ways with the communication passage 67, the first air inlet 10 and the second air inlet 80. In this connecting passage 65 are inserted, on the first air inlet 10 side, a shuttle valve device 71 which is a shuttle valve for controlling the stream of air and also, on the second air inlet 80 side, a throttle valve device 81 which is a throttle valve for controlling the air stream. The shuttle valve device 71 side and the throttle valve device 81 side are connected by an air passage 66.

In the shuttle valve device 71 is fitted a cylindrical collar 75 which is larger in diameter than the first air inlet 10 and the air passage 66 and smaller in diameter than the connecting passage 65.

The collar 75 is provided with slits 76a and 76b formed in the upper and lower surfaces of its one end on the first air inlet 10 side through which the air passes, and also with slits 77a and 77b in the upper and lower surfaces of its other end on the air passage 66 side. Considering the strength of the collar 75, larger-diameter slits for air passage may be provided in a plurality of places in both ends of the collar 75.

Slidably inserted in the collar 75 is the shuttle valve piston 72 which is a valve body having nearly the same diameter as the inner diameter of the collar 75. At the end of the shuttle valve piston 72 on the first air inlet 10 side, a valve rubber 73 is installed, so that the connecting passage 65 and the first air inlet 10 can be closed when the shuttle valve piston 72 has come as far as the rightmost end position in the collar 75 as shown in FIG. 1(b).

On the throttle valve device 81 side in the connecting passage 65, a casing 79 is fitted with its one end in contact with the collar 75 and the other end in contact with the second air inlet 80. On one end side of this casing 79 there is defined a space, which is formed as a small-diameter air passage 66. An interior space formed on the other end side of this casing 79 is a large-diameter space, in which the throttle valve piston 82 is inserted.

Figure 3:
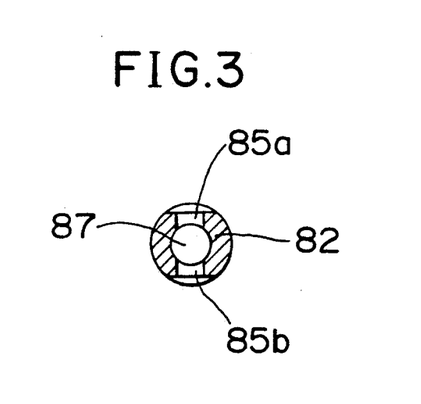
FIG. 3 is a sectional view of a throttle valve piston taken along line III—III of FIG. 1(b)

FIG. 3 is a sectional view of the throttle valve piston 82 taken along line III—III of FIG. 1(b). This throttle valve piston 82 is in contact at both side faces with the inner periphery of the casing 79 such that the piston is slidably movable inside of the interior space on the other end section of the casing 79.

Also, there is formed a small-diameter throttle passage 84 on one end side of the throttle valve piston 82. Furthermore, slits 85a and 85b, upper and lower, for air passage are formed in the central section of the throttle valve piston 82.

There is formed an inner passage 87 on the other end side of the throttle valve piston 82.

That is, the inner passage 87 communicates with the throttle passage 84 and the slits 85a and 85b.

Next, the construction of the traction control valve 41 will be explained by referring to FIG. 7.

Installed in the traction control valve 41, in the upper part in the drawing, are a pair of control valves 94, right and left, with a feed air passage 91 at the center which communicates with the second circuit 88a connected to the air reservoir 39. Also a pair of solenoid valves 95 are provided in the lower part in the drawing, on the right and left side of the air feed passage 91. The control valve 94 is made up of a piston section 94a and a piston section 94b which are connected by a piston rod 94c. This control valve 94 is a normally closed control valve which is normally closed to the air feed passage 91 by a return spring 97, thereby controlling the supply of air to an air pressure line 92.

The solenoid valve 95 is a normally closed control valve which is normally closed to the air feed passage 91 by a hold spring 98. Around this solenoid valve 95 is provided a solenoid coil 99, and in the lower part in the drawing is installed an exhaust valve 96 for discharging the air into the atmosphere.

A chamber 100 is provided between the control valve 94 and the solenoid valve 95. Also, provided in the lower part of the air pressure passage 92 is an exhaust air passage 93, which communicates with the exhaust valve 96. An elastic member 101 is provided on the piston section 94b of the control valve 94, to stop the flow of air from the air pressure passage 92 to the exhaust passage 93 when the control valve 94 has moved upward in the drawing.

Next, the operation of the present embodiment of the brake control device will be explained.

First, at the time of brake application, the air supplied from the first air inlet 10 to the connecting passage 65 pushes one end of the shuttle valve piston 72 until the shuttle valve piston 72 comes in contact with one end of the air passage 66, thus stopping the flow of air between the shuttle valve device 71 side and the throttle valve device 81 side. The air, therefore, is supplied from the slits 76a and 76b of the collar 75 to the air chamber 1 through the hold valve 4 side, thus applying the brakes.

When the ECU 43 has detected the possibility of wheel lock in accordance with signals from the speed sensors 42, a specific electric voltage is applied to the solenoid coil 20a on the hold valve 4 side in the valve unit 6, closing the hold valve body 15 to thereby stop the supply of air to the air chamber 1. At the same time, the voltage is applied also to the solenoid coil 20b on the decay valve 5 side, thus opening the decay valve body 17.

Thence the air in the air chamber 1 is discharged through the route of a chamber passage 31b →the decay valve chamber 18→ the exhaust passage 61→ the exhaust valve 16. Then the air piston 2 in the modulator 21 is moved toward compressing the air chamber 1 by the spring force of the piston return spring 48 and a fluid pressure acting on the hydraulic piston 22. Since the hydraulic piston 22 also operates in interlock with the air piston 2, the brake fluid in the wheel cylinder 3 is drawn out toward the modulator 21, being decreased in pressure to thereby prevent wheel lock.

When holding the fluid pressure in the wheel cylinder 3, both the hold valve body 15 and the decay valve body 17 are closed to hold the air within the air chamber 1.

Furthermore, when applying the pressure again to the wheel cylinder 3, the hold valve body 15 is opened with the decay valve body 17 left closed, and the air from the first air inlet 10 is supplied to the air chamber 1 from the hold valve 4 side.

Subsequently the operation of the brake control device during traction brake control will be explained.

Figure 7:
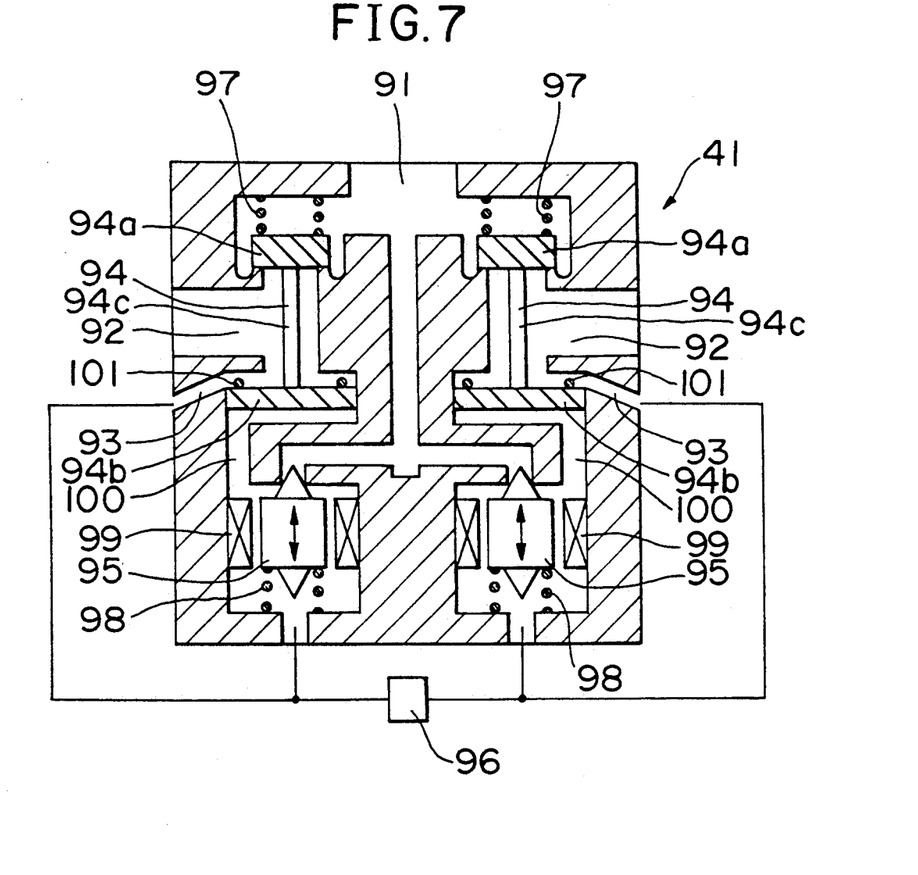
FIG. 7 is a cross sectional view showing the construction of a traction control valve in the embodiment.

When the ECU has judged an acceleration slip of only one or both of the drive wheels in accordance with information from the speed sensor 42 of each wheel, a specific electric voltage will be applied to one or both of the solenoid coils 99 of the traction control valve 41 shown in FIG. 7. The solenoid valve 95 opens the feed air passage 91 side and closes the exhaust valve 96 side. Then the air that has come from the air reservoir 39 into the chamber 100 through the second circuit 88a and the air feed passage 91 pushes the bottom of the control valve 94 upwardly. Therefore, the control valve 94 moves upwardly in the drawing and opens to communicate the feed air passage 91 with the air pressure passage 92. The air from the air reservoir 39, therefore, flows into the connecting passage 65 at the second air inlet 80 through the second circuit 88b. At this time, the air pressure passage 92 and the exhaust passage 93 are closed by means of the elastic member 101, and therefore the air coming from the feed air passage 91 into the air pressure passage 92 will not be discharged out through the exhaust valve 96.

The air that has entered the connecting passage 65 works to push the other end of the throttle valve piston 82 as shown in FIG. 1 (b), then flowing only from the inside of the throttle passage 84 to the shuttle valve device 71 side. The air then pushes the other end of the shuttle valve piston 72, which in turn comes into contact with the first air inlet 10, thereby closing the passage between the connecting passage 65 and the first air inlet 10. Subsequently, this air is then supplied into the air chamber 1 after passing through the slits 77a and 77b of the collar 75, the communicating passage 67, the hold valve 4, and the chamber passage 31a, to thereby perform brake control.

That is to say, the air from the air reservoir 39 is supplied through the route of the traction control valve 41→the second circuit 88b→the second air inlet 80→the connecting passage 65→both the inner passage 87 and slits 85a and 85b→the throttle passage 84→the air passage 66→the collar 75→the slits 77a and 77b→the communication passage 67→the chamber passage 31a→the air chamber 1.

At this time, a specific electric voltage is supplied to the solenoid coils 20a and 20b in accordance with the slipping condition of each wheel, to actuate the hold valve 4 and the decay valve 5, thereby adjusting the traction brake control.

Next, the operation of the brake control device when ordinary brake control is released will be explained.

The air from the air chamber 1 flows from the hold valve 4 side into the connecting passage 65, being discharged at the brake valve 38 through the first air inlet 10 after passing through the slits 76a and 76b of the collar 75 and the inside of the collar 75.

Figure 2:
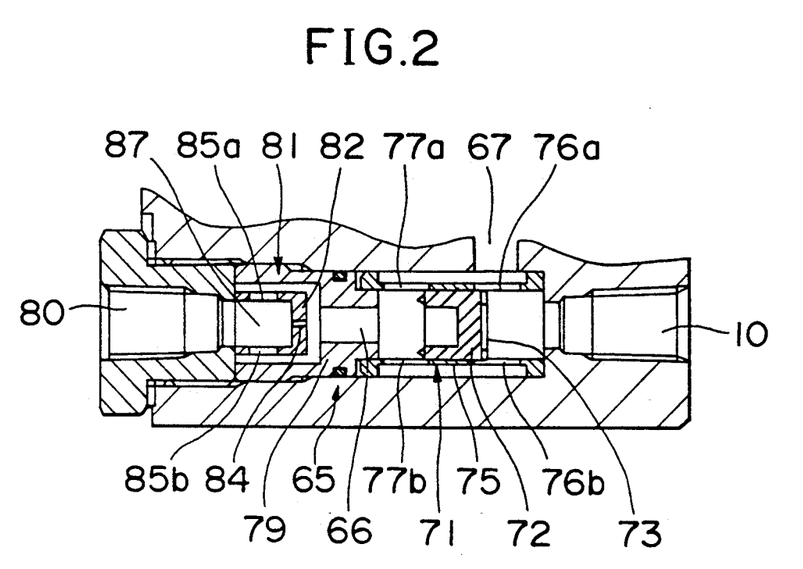
FIG. 2 is a sectional side elevation of the valve unit of a modulator in the embodiment at the time of pressure reduction.

At this time, the air is flowing in the inside space of the collar 75 in the connecting passage 65, there is built up a negative pressure in relation to the air passage 66 because of the flow velocity of the air. Therefore, the shuttle valve piston 72 which is in contact with one end of the air passage 66 moves toward the first air inlet 10 side as shown in FIG. 2, thereby communicating the shuttle valve device 71 side in the connecting passage 65 with the throttle valve device 81 side. Then, the air from the hold valve 4 side flows into the collar 75 through the slits 77a and 77b of the collar 75. This air flowing through the opened air passage 66 pushes one end of the throttle valve piston 82 until the other end of the throttle valve piston 82 contacts the second air inlet 80. Accordingly, the air coming from the air passage 66 flows into the inner passage 87 of the throttle valve piston 82 through not only the throttle passage 84 but the slits 85a and 85b, being discharged at the exhaust valve 96 of the traction control valve 41 after passing through the second air inlet 80.

That is, the air from the air chamber 1 flows to the connecting passage 65 through the route of the chamber passage 31a→the hold valve chamber 11→the communication passage 67, and furthermore from this connecting passage 65 the stream of the air is branched into two directions, being discharged. Namely, the air flowing in one direction goes into the collar 75 on one end side of the shuttle valve piston 72 through the slits 76a and 76b, and is discharged through the first air inlet 10→the first circuit 86b→the brake valve 38. The air branched off to the other direction flows from the slits 77a and 77b into the collar 75 on the other end side of the shuttle valve piston 72, and goes into the inner passage 87 of the throttle valve piston 82 through the air passage 66→both the throttle passage 84 and the slits 85a and 85b, being discharged out at the exhaust valve 96 of the traction control valve 41 after passing through the second air inlet 80 and the second circuit 88b.

According to the present embodiment, the brake control device is provided with a shuttle valve mechanism having two systems of air exhaust routes when the brakes are normally released. In addition to this shuttle valve mechanism, a throttle valve mechanism is provided to decrease the built-up rate of pressure application during traction control and to increase the built-up rate of pressure reduction at the time of normal release of the brakes.

It is, therefore, possible to largely diminish vehicle body vibration by improving brake controllability and also to raise the built-up rate of pressure reduction in the air chamber 1 at the time of normal release of the brakes.

The shuttle valve device and the throttle valve device may be so designed and formed as to be opened and closed not only by the air pressure but by a solenoid valve and a fluid pressure control valve which operate in interlock with the driver's brake pedal operation.

The modulators 21 of the present embodiment are used only on the rear wheels side as shown in FIG. 6. The front wheel cylinders are connected with modulators 9 which are common modulators. In the case of a four-wheel drive vehicle, both the front and rear wheel cylinders are connected with the modulators 21.

In the present embodiment, the modulator, the shuttle valve device and the throttle valve device are mounted in one body, but may be separately mounted each as an independent device.

The brake control device of the present invention, as described above, is furnished with the throttle valve device 81 for reducing the built-up rate of pressure application only at the time of application of traction control pressure.

Therefore, it is possible to perform stabilized traction control during traction control. Also when the brakes are released in normal operation, the air can be exhausted at two points of the brake valve 38 and the exhaust valve 96 of the traction control valve 41, thereby improving responsivity to brake release.

Furthermore, the device for adjusting the built-up rate of pressure application during traction control, being provided in one body with the modulator, together with the shuttle valve device, can be made compact in construction using common components.

What is claimed is:

1. A brake control device for providing brake control and traction control for a motor vehicle having a plurality of wheel cylinders, comprising:
   a modulator for supplying a braking pressure to at least one of said wheel cylinders;
   a brake valve for supplying a first fluid pressure to said modulator for said brake control of said at least one of said wheel cylinders;
   a traction control valve for supplying a second fluid pressure to said modulator for said traction control of said at least one of said wheel cylinders;
   a valve unit provided between said modulator and said brake and traction control valves and having a shuttle valve and a throttle valve, wherein
   said shuttle valve selects the higher one of said first fluid pressure or said second pressure and supplies said higher fluid pressure to said modulator; and
   said throttle valve decreases the fluid flow from said traction control valve to said modulator during traction control while increasing the fluid flow from said modulator to said traction control valve upon release of the brakes of the vehicle.

2. A brake control device as defined in claim 1, wherein said valve unit further includes a hold valve for reducing said first fluid pressure to said modulator and a decay valve for withdrawing an excess fluid pressure of said first fluid pressure for preventing the locking of the brakes of said motor vehicle.

3. A brake control device as defined in claim 1, wherein said shuttle valve includes a shuttle valve piston which moves in response to an amount of fluid pressure supplied thereto, and a first opening and a second opening, both of which are connected to said modulator through a communication passage.

4. A brake control device as defined in claim 3, wherein said shuttle valve piston takes three positions: a first position for closing said first opening to restrict a fluid flow from said traction control valve to said modulator, a second position for closing said second opening to restrict a fluid flow from said brake valve to said modulator, and a third position for opening said first opening and said second opening for facilitating a fluid withdrawal from said modulator.

5. A brake control device as defined in claim 1, wherein said modulator includes an air chamber which is selectively provided with either said first fluid pressure or said second fluid pressure through said shuttle valve, said air chamber driving an air cylinder to convert an air pressure in said air chamber to a hydraulic pressure.

6. A brake control device as defined in claim 1, wherein said throttle valve includes a throttle valve piston having a throttle valve passage for decreasing said second fluid pressure when said traction control is activated, said second fluid pressure driving said shuttle valve to form a fluid passage to allow a fluid flow from said traction control valve to said modulator.

7. A brake control device as defined in claim 1, wherein said throttle valve includes a throttle valve piston having a throttle valve passage and a plurality of openings for passing a fluid pressure, said throttle valve piston sliding to open said plurality of openings to promote an exhaustion of fluid pressure from said modulator both through said throttle valve passage and said plurality of openings.

8. A brake control device, comprising:
   a brake valve provided with a first air pressure for brake control of at least one wheel cylinder;
   a modulator mounted between said brake valve and said wheel cylinder for converting said first air pressure to a brake hydraulic pressure to be supplied to said wheel cylinder;
   a traction control valve provided with a second air pressure for traction control of said wheel cylinder;
   a shuttle valve mounted between said brake valve and said modulator and in air pressure communication with said traction control valve for selectively supplying said modulator with a higher one of said first air pressure from said brake valve or said second air pressure from said traction control valve; and
   a throttle valve mounted between said traction control valve and said shuttle valve, said throttle valve having a throttle valve piston selectively positioned in a first position for reducing the rate of pressure buildup during traction control, or in a second position for increasing the rate of pressure reduction at the time of brake release, said throttle valve piston defining when said throttle valve piston is in said first position, an air pressure path which is relatively narrower than the air pressure path defined by said throttle valve piston when said throttle valve piston is in said second position.

9. A brake control device as claimed in claim 8, wherein an air pressure from said modulator is exhausted simultaneously through both an inlet connected to said brake valve and a second inlet connected to said control valve when a driver releases said brake control.

10. A brake control device as claimed in claim 8, wherein said throttle valve piston has a throttle valve passage for passing said second air pressure, so that when applying the brake pressure in said traction control, said throttle valve piston will slide toward said modulator to supply said second air pressure from said traction control valve to said modulator only through said throttle valve passage, thereby decreasing the built-up rate of pressure in said modulator.

11. A brake control device as claimed in claim 8, wherein said throttle valve piston has a throttle valve passage and a plurality of slits for passing an air pressure, so that when said air pressure from said modulator is to be exhausted, said throttle valve piston slides toward said traction control valve side to exhaust the pressure through said throttle valve passage and said plurality of slits, thereby increasing the pressure discharge rate.

* * * * *